(12) United States Patent
Cheon

(10) Patent No.: US 11,509,454 B2
(45) Date of Patent: Nov. 22, 2022

(54) APPARATUS FOR PROCESSING MODULAR MULTIPLY OPERATION AND METHODS THEREOF

(71) Applicant: CRYPTO LAB INC., Seoul (KR)

(72) Inventor: Jung Hee Cheon, Seoul (KR)

(73) Assignee: CRYPTO LAB INC., Seoul (KR)

( * ) Notice: Subject to any disclaimer, the term of this patent is extended or adjusted under 35 U.S.C. 154(b) by 358 days.

(21) Appl. No.: 16/811,555

(22) Filed: Mar. 6, 2020

(65) Prior Publication Data

US 2020/0374103 A1 Nov. 26, 2020

(30) Foreign Application Priority Data

May 22, 2019 (KR) .......................... 10-2019-0059940
Dec. 5, 2019 (KR) .......................... 10-2019-0160760

(51) Int. Cl.
| | |
|---|---|
| *H04L 9/06* | (2006.01) |
| *G06F 7/72* | (2006.01) |
| *G06F 5/01* | (2006.01) |
| *H04L 9/30* | (2006.01) |
| *H04L 9/00* | (2022.01) |

(52) U.S. Cl.
CPC .............. *H04L 9/0618* (2013.01); *G06F 5/01* (2013.01); *G06F 7/722* (2013.01); *G06F 7/727* (2013.01); *H04L 9/008* (2013.01); *H04L 9/3033* (2013.01)

(58) Field of Classification Search
CPC ..... H04L 9/0618; H04L 9/008; H04L 9/3033; H04L 9/304; H04L 9/06; H04L 9/30; G06F 5/01; G06F 7/722; G06F 7/727; G06F 7/72
See application file for complete search history.

(56) References Cited

U.S. PATENT DOCUMENTS

| | | | |
|---|---|---|---|
| 7,945,784 B1 | 5/2011 | Masinter | |
| 2003/0065696 A1 | 4/2003 | Ruehle | |
| 2009/0228717 A1* | 9/2009 | Futa | H04L 9/302 713/190 |
| 2014/0355758 A1 | 12/2014 | Feix | |
| 2015/0379301 A1* | 12/2015 | Lesavich | G06F 16/951 726/28 |
| 2016/0179473 A1* | 6/2016 | Bos | G06F 9/3001 380/28 |

(Continued)

FOREIGN PATENT DOCUMENTS

KR 10-2005-0064107 A 6/2005

OTHER PUBLICATIONS

Korean Office Action for KR Patent Application No. 10-2019-0160760 filed on Dec. 5, 2019, on behalf of Crypto Lab Inc. dated Nov. 27, 2020. Korean original + English Trans. 7 Pages.

(Continued)

*Primary Examiner* — Quazi Farooqui

(74) *Attorney, Agent, or Firm* — Steinfl + Bruno LLP

(57) ABSTRACT

Disclosed is a ciphertext computation method. The ciphertext computation method includes: receiving a modular computation command for a plurality of ciphertexts; performing a modular computation for the plurality of ciphertexts by using a lookup table storing a plurality of predetermined prime number information; and outputting a result of the computation.

12 Claims, 10 Drawing Sheets

(56) References Cited

U.S. PATENT DOCUMENTS

2016/0239267 A1 8/2016 Bos

OTHER PUBLICATIONS

International Search Report for PCT/KR2020/004105 filed on Mar. 26, 2020 on behalf of Crypto Lab Inc. dated Jul. 13, 2020, 3 pages.
Written Opinion for PCT/KR2020/004105 filed on Mar. 26, 2020 on behalf of Crypto Lab Inc. dated Jul. 13, 2020, 5 pages.

* cited by examiner

FIG. 4

```
Algorithm 1 First modular multiplication
Input: A, B, q, l = ⌊log₂q⌋ + 1, T = ⌊2^(2l)/q⌋
Output: A × B (mod q)
 1: U ← A × B
 2: V ← U ≫ (l-1)
 3: W ← (V × T) ≫ (l+1)
 4: X ← W × q (mod 2^(l+1))
 5: Y ← U (mod 2^(l+1))
 6: if X < Y then
 7:     Z ← 2^(l+1) + X-Y
 8: else
 9:     Z ← X-Y
10: end if
11: if Z ≥ 2 × q then
12:     Z ← Z-2×q
13: else if Z ≥ q then
14:     Z ← Z-q
15: end if
16: return Z
```

FIG. 6

```
Algorithm 2 Second modular multiplication
```
Input: A, B, q, l = $\lfloor \log_2 q \rfloor + 1$, B' = $\lfloor (B \ll (l+1))/q \rfloor$
Output: A × B (mod q)
 1: X ← A × B (mod $2^{l+1}$)
 2: W ← (A × B') ≫ (l+1)
 3: Y ← W × q (mod $2^{l+1}$)
 4: Z ← X−Y
 5: if Z ≥ q then
 6:     Z ← Z−q
 7: end if
 8: return Z

FIG. 8

| Index | q | T |
|---|---|---|
| 1 | $2^{61} - 2^{26} + 1$ | $2^{61} + 2^{26} - 1$ |
| 2 | $2^{61} - 2^{24} - 2^{20} + 1$ | $2^{61} + 2^{24} + 2^{20} - 1$ |
| 3 | $2^{61} - 2^{24} + 1$ | $2^{61} + 2^{24} - 1$ |
| 4 | $2^{61} - 2^{22} + 2^{19} + 1$ | $2^{61} + 2^{22} - 2^{19} - 1$ |
| 5 | $2^{61} - 2^{21} + 1$ | $2^{61} + 2^{21} - 1$ |
| 6 | $2^{61} - 2^{21} + 2^{16} + 1$ | $2^{61} + 2^{21} - 2^{16} - 1$ |
| 7 | $2^{61} + 2^{22} + 2^{20} + 1$ | $2^{61} - 2^{22} - 2^{20} - 1$ |
| 8 | $2^{61} + 2^{23} - 2^{18} + 1$ | $2^{61} - 2^{23} + 2^{18} - 1$ |
| 9 | $2^{61} + 2^{23} + 2^{21} + 1$ | $2^{61} - 2^{23} - 2^{21} - 1$ |
| 10 | $2^{61} + 2^{24} - 2^{19} + 1$ | $2^{61} - 2^{24} + 2^{19} - 1$ |
| 11 | $2^{61} + 2^{25} + 2^{23} + 1$ | $2^{61} - 2^{25} - 2^{23} - 1$ |
| 12 | $2^{61} + 2^{26} + 2^{16} + 1$ | $2^{61} - 2^{26} - 2^{16} - 1$ |

FIG. 10

|  | iCRT | NTT | MULTIPLICATION | NTT-1 | CRT |
|---|---|---|---|---|---|
| NUMBER IN PARALLELIZATION | 2nk | n | n | n | n |
| NUMBER OF TIMES OF BITWISE COMPUTATION | $O(\log q \log Q)$ | $O(\log n)$ | $O(\log^2 Q)$ | $O(\log n)$ | $O(\log^2 q)$ |

US 11,509,454 B2

APPARATUS FOR PROCESSING MODULAR MULTIPLY OPERATION AND METHODS THEREOF

CROSS-REFERENCE TO RELATED APPLICATION(S)

This application is based on and claims priority under 35 U.S.C. § 119 to Korean Patent Application No. 10-2019-0059940, filed on May 22, 2019, and Korean Patent Application No. 10-2019-0160760, filed on Dec. 5, 2019 in the Korean Intellectual Property Office, the disclosures of which are incorporated by reference herein in its entirety.

BACKGROUND OF THE INVENTION

Field of the Invention

Apparatuses and methods consistent with the disclosure relate to a computation device for performing modular multiplication, and a method therefor, and more particularly, to a computation device for performing modular multiplication by using a plurality of predetermined prime number information, and a method therefor.

Description of the Related Art

A deep neural network has provided an excellent solution in various fields such as speech recognition and image classification. However, the deep neural network requires vast amount of data in a learning process.

Therefore, an approach which is called privacy-preserving machine learning capable of reliably using personal data has become important. Homomorphic encryption (HE) allows a computation in an encrypted state and thus is an ideal solution for the privacy-preserving described above.

However, since the computation for the homomorphic encryption is a polynomial computation with a significantly large modulus, the computation is time consuming, which is problematic. Therefore, there has been a demand for a method for reducing a time required for the computation for the homomorphic encryption and a speed of the computation for the homomorphic encryption.

SUMMARY OF THE INVENTION

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a computation device for performing modular multiplication by using a plurality of predetermined prime number information, and a method therefor.

According to an embodiment of the disclosure, a ciphertext computation method includes: receiving a modular computation command for a plurality of ciphertexts; performing a modular computation for the plurality of ciphertexts by using a lookup table storing a plurality of predetermined prime number information; and outputting a result of the computation.

The plurality of prime number information may each be expressed by a combination of exponentiations of 2, and in the performing of the modular computation, an individual shift computation may be performed based on an exponent of each of a plurality of exponentiations of 2 constituting a prime number, and addition or subtraction of shift computation results may be performed.

The prime number may be a value obtained by addition and subtraction of three or four exponentiations of 2 with different exponents.

The lookup table may include at least one of $2^{61}-2^{26}+1$, $2^{61}-2^{24}-2^{20}+1$, $2^{61}-2^{24}+1$, $2^{61}-2^{22}+2^{19}+1$, $2^{61}-2^{21}+1$, $2^{61}-2^{21}+2^{16}+1$, $2^{61}+2^{22}+2^{20}+1$, $2^{61}+2^{23}+2^{21}+1$, $2^{61}+2^{24}-2^{19}+1$, $2^{61}+2^{25}+2^{23}+1$, $2^{61}+2^{23}-2^{18}+1$ or $2^{61}+2^{26}+2^{16}+1$.

The performing of the modular computation may include: performing first multiplication of a first ciphertext and a second ciphertext; performing second multiplication of reciprocal number information corresponding to one of the plurality of prime number information and a result of the first multiplication; performing third multiplication by using a result of the second multiplication and the one prime number information; and performing subtraction of the result of the first multiplication and a result of the third multiplication.

The one prime number information may include information on exponentiations of 2, and in the performing of the third multiplication, an individual shift computation may be performed based on an exponent of each of the exponentiations of 2, and the third multiplication may be performed by performing addition or subtraction of shift computation results.

The reciprocal number information may include information on exponentiations of 2, and in the performing of the second multiplication, an individual shift computation may be performed based on an exponent of each of the exponentiations of 2, and the second multiplication may be performed by performing addition or subtraction of shift computation results.

In the performing of the second multiplication and the performing of the third multiplication, a computation result may be output while having the same number of bits as that of the first ciphertext or the second ciphertext.

The performing of the modular computation may include: performing first multiplication of "a pre-calculated value obtained by multiplying a reciprocal number corresponding to one prime number information and a second ciphertext" and a first ciphertext; performing second multiplication of the first ciphertext and the second ciphertext; performing third multiplication by using a result of the first multiplication and the prime number information; and performing subtraction of a result of the second multiplication and a result of the third multiplication.

A prime number corresponding to the prime number information may be a value obtained by multiplying a plurality of different scaling factors, and the plurality of different scaling factors may be values that are disjoint from each other.

In the performing of the modular computation, the modular computation may be performed for each basis of each of the plurality of ciphertexts.

According to another embodiment of the disclosure, a computation device includes: a memory configured to store at least one instruction and a plurality of predetermined prime number information; and a processor configured to execute the at least one instruction, wherein the processor is configured to execute the at least one instruction to perform a modular computation for a plurality of ciphertexts by using one of the plurality of predetermined prime number information.

The plurality of prime number information may each be expressed by a combination of exponentiations of 2, and the processor may be configured to perform an individual shift computation based on an exponent of each of a plurality of exponentiations of 2 constituting a prime number, and perform addition or subtraction of shift computation results.

A prime number corresponding to the prime number information may be a value obtained by multiplying a plurality of different scaling factors, the plurality of different scaling factors may be values that are disjoint from each other, and the processor may be configured to perform the modular computation for each basis of each of the plurality of ciphertexts.

The processor may be a field programmable gate array (FPGA).

As described above, according to various embodiments of the disclosure, in the ciphertext computation method according to the disclosure, since the modular computation is performed by using predetermined prime number information, it is possible to use only a small lookup table, and since the predetermined prime number information is expressed by a combination of exponentiations of 2 and an integer computation may be performed only with a shift computation and addition and subtraction, it is possible to further speed-up the computation.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other embodiments of the disclosure will be more apparent by describing certain embodiments of the disclosure with reference to the accompanying drawings, in which:

FIG. 4 is a diagram for describing a modular computation method according to a first embodiment of the disclosure;

FIG. 6 is a diagram for describing a modular computation method according to a second embodiment of the disclosure;

FIG. 8 is a diagram illustrating an example of a set of prime numbers according to an embodiment of the disclosure;

FIG. 10 is a diagram for describing an effect in case of performing the modular computations in parallel.

DETAILED DESCRIPTION OF THE EXEMPLARY EMBODIMENTS

Hereinafter, the disclosure will be described in detail with reference to the accompanying drawings. In an information (data) transmission process performed in the disclosure, encryption/decryption may be applied as needed. In the disclosure and claims, expressions describing the information (data) transmission process are to be construed as including the case of performing encryption/decryption, even if not mentioned separately. Expressions such as "transmit (transfer) from A to B" or "receive by A from B" in the disclosure include transmission (transfer) or reception of another medium in between, and do not just represent direct transmission (transfer) from A to B or direct reception by A from B.

In the description of the disclosure, the order of each step should be understood in a non-limited manner unless a preceding step should be performed logically and temporally before a following step. That is, except for the exceptional cases as described above, even if a process described as a following step is preceded by a process described as a preceding step, it does not affect the nature of the disclosure, and the scope of rights should be defined regardless of the order of the steps. In addition, in the present specification, "A or B" is defined not only as selectively referring to either A or B, but also as including both A and B. In addition, in the present specification, the term "comprise" has a meaning of further including other components in addition to the components listed.

Only essential components necessary for explanation of the disclosure are described in the disclosure, and components not related to the essence of the disclosure are not mentioned. The disclosure should not be construed in an exclusive sense that includes only the recited elements but should be interpreted in a non-exclusive sense to include other elements as well.

In the disclosure, the term "value" is defined as including not only a scalar value but also a vector and a polynomial.

A mathematical computation and calculation of each step of the disclosure to be described later may be implemented by a computer operation by a well-known coding method for carrying out the computation or the calculation, and/or coding designed suitable for the disclosure.

Specific expressions described below are exemplarily described among various possible alternatives, and the scope of the disclosure should not be construed as being limited to the expressions mentioned in the disclosure.

For convenience of explanation, the following notations will be used in the disclosure.

a←D: Select element (a) according to distribution (D)

$s_1, s_2 \in R$: Each of $S_1$ and $S_2$ is an element of a set R.

mod(q): Perform a modular computation by an element q $\lceil \cdot \rfloor$: Round up an internal value Hereinafter, various embodiments of the disclosure will be described in detail with reference to the accompanying drawings.

Figure 1:
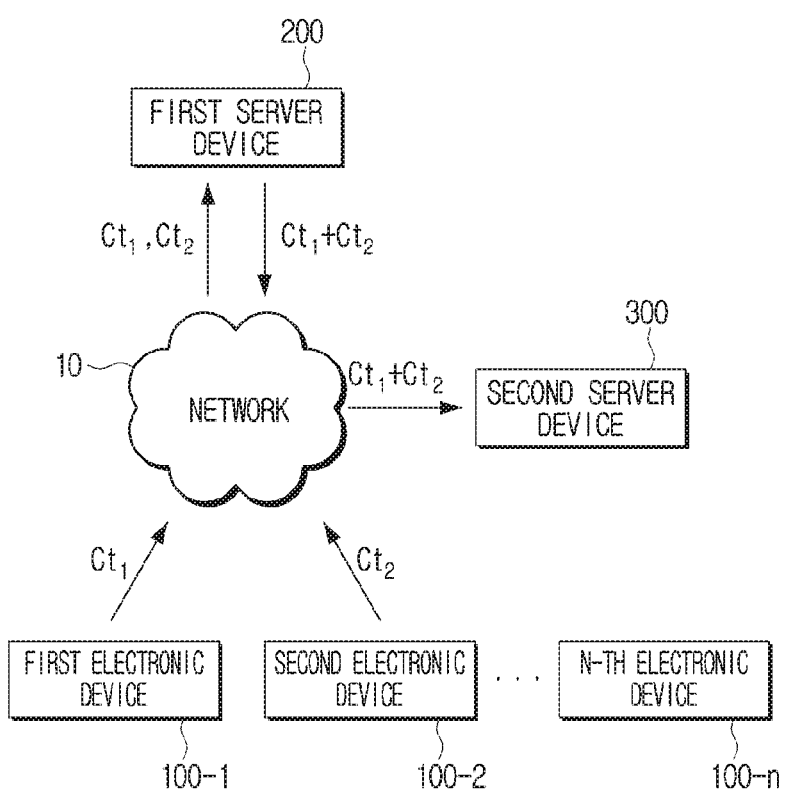
FIG. 1 is a diagram for describing a structure of a network system according to an embodiment of the disclosure.

FIG. 1 is a diagram for describing a network system according to an embodiment of the disclosure.

Referring to FIG. 1, the network system may include a plurality of electronic devices 100-1 to 100-n, a first server device 200, and a second server device 300, and the respective components may be connected to one another through a network 10.

The network 10 may be implemented by various types of wired and wireless communication networks, a broadcasting communication network, an optical communication network, a cloud network, or the like, and the respective devices may be connected to each other by a method such as wireless fidelity (Wi-Fi), Bluetooth, and near field communication (NFC), without a separate medium.

Although FIG. 1 illustrates the case that the number of electronic devices is plural (100-1 to 100-n), it is not necessary that a plurality of electronic devices are used, and only one electronic device may be used. As an example, the electronic devices 100-1 to 100-n may be implemented by various types of devices such as a smartphone, a tablet personal computer (PC), a game machine, a PC, a laptop PC, a home server, and a kiosk, and may also be implemented by a home appliance with an Internet of Things (IoT) function.

A user may input various information through the electronic devices 100-1 to 100-n that the user uses. The input information may be stored in the electronic devices 100-1 to 100-n and may also be transmitted to and stored in an external device for a reason such as capacity and security. In FIG. 1, the first server device 200 may serve to store such information and the second server device 300 may serve to use a part or all of information stored in the first server device 200.

Each of the electronic devices 100-1 to 100-n may perform homomorphic encryption on the input information and transmit a homomorphic ciphertext to the first server device 200.

Each of the electronic devices 100-1 to 100-n may allow an encryption noise calculated in a process of performing the homomorphic encryption, that is, an error, to be included in the ciphertext. For example, the homomorphic ciphertext generated by each of the electronic devices 100-1 to 100-n may be generated in a form in which a result value including a message and an error value is restored when the homomorphic ciphertext is decrypted by using a secret key later.

As an example, the homomorphic ciphertext generated by each of the electronic devices 100-1 to 100-n may be generated in a form in which the following property is satisfied when the homomorphic ciphertext is decrypted by using the secret key.

$$Dec(ct,sk)=<ct,sk>=M+e \pmod{q}$$ [Expression 1]

Here, < and > refer to a usual inner product, ct denotes a ciphertext, sk denotes a secret key, M denotes a plaintext message, e denotes an encryption error value, and mod q denotes a modulus of the ciphertext. It is necessary that a value that is larger than a result value M obtained by multiplying the message and a scaling factor $\Delta$ is selected as q. As long as an absolute value of the error value e is sufficiently smaller than M, a decryption value (M+e) of the ciphertext may replace the original message with the same precision in significant digit arithmetic. In decrypted data, the error may be arranged on the least significant bit (LSB) side and M may be arranged on the second least significant bit side.

In case that a size of the message is excessively small or large, the size of the message may be adjusted by using the scaling factor. In case of using the scaling factor, a message in a real number form may be encrypted in addition to a message in an integer form, and thus applicability may be greatly improved. Further, a size of an area where messages are present in a ciphertext after the computation, that is, a size of an effective area may be adjusted by adjusting the size of the message using the scaling factor.

According to an embodiment, the modulus q of the ciphertext may be set in various forms and used. As an example, the modulus of the ciphertext may be set in a form of exponentiation of the scaling factor $\Delta$, that is, $q=\Delta^L$. In case that $\Delta$ is 2, the modulus of the ciphertext may be set in a form in which, for example, $q=2^{10}$. Alternatively, q may be expressed by a combination of exponentiations of 2 satisfying a certain condition as illustrated in FIG. 8.

As another example, the modulus of the ciphertext may be set to a value obtained by multiplying a plurality of different scaling factors. The respective factors may be set to values within similar ranges, that is, similar values. For example, the scaling factors may be set so that $q=q_1, q_2, q_3, \ldots,$ and $q_x$, and $q_1, q_2, q_3, \ldots,$ and $q_x$ may each have a value similar to the scaling factor $\Delta$ and may be set to values that are disjoint from each other.

In case that the scaling factor is set in the above-described manner, the entire computation may be divided into a plurality of modulus computations and performed according to a Chinese remainder theorem (CRT), thereby reducing computation loads.

Further, as factors having similar values are used, almost the same result as the result value in the above-described example may be obtained when rounding processing is performed in a process as described later.

The first server device 200 may store the received homomorphic ciphertext as it is without performing decryption.

The second server device 300 may request for a specific processing result of the homomorphic ciphertext to the first server device 200. The first server device 200 may perform a specific computation according to the request from the second server device 300 and then transmit a result of the computation to the second server device 300.

As an example, in case that ciphertexts $ct_1$ and $ct_2$ transmitted by two electronic devices 100-1 and 100-2 are stored in the first server device 200, the second server device 300 may request for a value obtained by adding up information provided from the two electronic devices 100-1 and 100-2 to the first server device 200. The first server device 200 may perform a computation of adding up two ciphertexts according to the request and then transmit a result value ($ct_1+ct_2$) to the second server device 300.

Due to the property of the homomorphic ciphertext, the first server device 200 may perform the computation without performing decryption and a result value of the computation may also have a ciphertext form.

The first server device 200 may transmit a computation result ciphertext to the second server device 300. The second server device 300 may decrypt the received computation result ciphertext to obtain a computation result value of data included in each homomorphic ciphertext. Further, the first server device 200 may perform the computation multiple times according to a request from the user.

Meanwhile, although FIG. 1 illustrates the case that the first and second electronic devices perform the encryption and the second server device performs the decryption, the disclosure is not limited thereto.

Further, although the case that, among the homomorphic encryption methods, homomorphic encryption for arithmetic of approximate numbers (HEAAN) satisfying Expression 1 is used is illustrated in FIG. 1, a modular computation method as described later may also be applied to a homomorphic encryption method other than the HEAAN.

Figure 2:
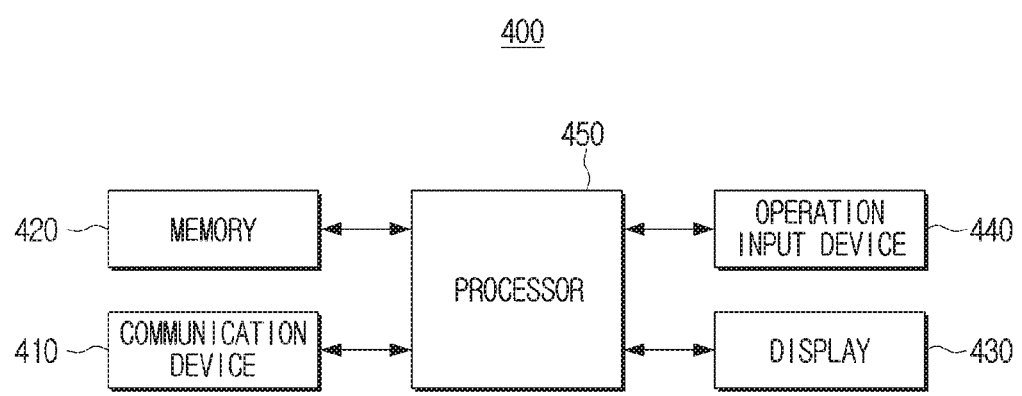
FIG. 2 is a block diagram illustrating a configuration of a computation device according to an embodiment of the disclosure.

FIG. 2 is a block diagram illustrating a configuration of a computation device according to an embodiment of the disclosure.

For example, in the system of FIG. 1, an device which performs the homomorphic encryption, such as the first electronic device or the second electronic device, an device which performs a computation for a homomorphic ciphertext, such as the first server device, an device which performs decryption of the homomorphic ciphertext, such as the second server device, or the like may be referred to as the computation device. Such a computation device may be implemented by various types of devices such as a PC, a notebook PC, a smartphone, a tablet PC, a server, and the like.

Referring to FIG. 2, a computation device 400 may include a communication device 410, a memory 420, a display 430, an operation input device 440, and a processor 450.

The communication device 410 is formed to connect the computation device 400 to an external device (not illustrated), and may be connected to the external device through a local area network (LAN) and the Internet network or be connected to the external device through a universal serial bus (USB) port or a wireless communication (for example, Wi-Fi 802.11a/b/g/n, NFC, or Bluetooth) port. Such a communication device 410 may also be referred to as a transceiver.

The communication device 410 may receive a public key from the external device and may transmit a public key generated by the computation device 400 itself to the external device.

Further, the communication device 410 may receive a message from the external device and may transmit a generated homomorphic ciphertext to the external device.

Further, the communication device 410 may receive various parameters required for ciphertext generation from the external device. Meanwhile, in an actual implementation, the various parameters may be directly input by the user through the operation input device 440 as described later.

Further, the communication device 410 may receive a request for a computation for the homomorphic ciphertext from the external device and may transmit a result of the computation to the external device. Here, the requested computation may be a computation such as addition, subtraction, or multiplication (for example, modular multiplication). Here, the modular multiplication means a modular computation with a q element. Further, a value expressed by a combination of exponentiations of 2 as illustrated in FIG. 8 may be used as the q element.

The memory 420 may store at least one instruction related to the computation device 400. For example, the memory 420 may store various programs (or software) for operation of the computation device 400 according to various embodiments of the disclosure.

Such a memory 420 may be implemented in various forms such as a random access memory (RAM), a read only memory (ROM), a buffer, a cache, a flash memory, a hard disk drive (HDD), an external memory, and a memory card, but is not limited thereto.

The memory 420 may store a message to be encrypted. Here, the message may be various information used by the user such as credit information and personal information or may be information used by the computation device 300 such as position information or information related to a use history or the like such as Internet use time information.

Further, the memory 420 may store a public key, and in case that the computation device 400 directly generates a public key, the memory 420 may store various parameters required for generation of the public key and the secret key.

Further, the memory 420 may store a lookup table with a plurality of prime number information. Here, each of the plurality of prime number information may be expressed by a combination of exponentiations of 2. Further, the lookup table may also store reciprocal number information corresponding to the prime number information, together with the prime number information.

Further, the memory 420 may store a homomorphic ciphertext generated in a process as described later. In addition, the memory 420 may also store a homomorphic ciphertext transmitted from the external device. Further, the memory 420 may also store a computation result ciphertext which is a result of a computation process as described later.

The display 430 displays a user interface window for the user to select a function supported by the computation device 400. For example, the display 430 may display a user interface window for the user to select various functions provided by the computation device 400. Such a display 430 may be a monitor such as a liquid crystal display (LCD) monitor or an organic light emitting diode (OLED) monitor or may be implemented by a touch screen which may simultaneously function as the operation input device 440 as described later.

The display 430 may display a message for requesting an input of a parameter required for the generation of the secret key and the public key. Further, the display 430 may display a message for selection of a message as an encryption target. Meanwhile, in an actual implementation, the encryption target may be directly selected by the user or may be automatically selected. That is, personal information requiring encryption and the like may be automatically set as the encryption target without direct selection of a message by the user.

The operation input device 440 may receive selection of a function of the computation device 400 and a control command for the corresponding function from the user. For example, the operation input device 440 may receive a parameter required for the generation of the secret key and the public key from the user. Further, the user may set a message to be encrypted, through the operation input device 440.

The processor 450 controls a general operation of the computation device 400. For example, the processor 450 may control the general operation of the computation device 400 by executing at least one instruction stored in the memory 420. Such a processor 450 may be implemented by a single device such as a central processing unit (CPU) or an application-specific integrated circuit (ASIC) or may be implemented by a plurality of devices such as a CPU and a graphics processing unit (GPU).

Once a message to be transmitted is input, the processor 450 may store the message in the memory 420. Then, the processor 450 may perform the homomorphic encryption on the message by using various setting values and programs stored in the memory 420. In this case, the public key may be used.

The processor 450 may generate the public key required for the encryption by itself or may receive the public key from the external device. As an example, the second server device 300 which performs decryption may distribute the public key to other devices.

In case that the processor 450 generates the public key by itself, the processor 450 may generate the public key by using Ring learning with errors (Ring-LWE). For example, the processor 450 may first set various parameters and rings and store the parameters and rings in the memory 420. Examples of the parameter may include a bit length of a plaintext message, a size of the public key, and a size of the secret key.

The ring may be expressed by the following expression.

$$R = \mathbb{Z}_q[x]/(f(x)) \quad \text{[Expression 2]}$$

Here, R denotes the ring, $\mathbb{Z}_q$ denotes a coefficient, and $f(x)$ denotes an n-th polynomial.

The ring refers to a set of polynomials with a predetermined coefficient and means a set in which addition and multiplication are defined between elements and which is closed under addition and multiplication. Such a ring may also be referred to as a polynomial ring.

As an example, the ring refers to a set of n-th polynomials with a coefficient of $Z_q$. For example, if n is $\Phi(N)$, f(x) may mean an N-th cyclotomic polynomial. (f(x)) denotes an ideal of $Z_q[x]$ generated by f(x). Euler's totient function $\Phi(N)$ denotes the number of natural numbers that are disjoint from N and are smaller than N. When $\Phi_N(x)$ is defined as an N-th cyclotomic polynomial, the ring may also be expressed by the following Expression 3.

$$R = \mathbb{Z}_q[x]/(\Phi_N(x)) \qquad \text{[Expression 3]}$$

The secret key (sk) may be expressed as follows.

Meanwhile, the ring in Expression 3 includes a plaintext space that is a complex number. Meanwhile, among the sets as the ring described above, only a set including a plaintext space that is a real number may be used, to increase a computation speed for the homomorphic ciphertext.

In case that such a ring is set, the processor 450 may calculate the secret key (sk) from the ring.

$$sk \leftarrow (1, s(x)), s(x) \in R \qquad \text{[Expression 4]}$$

Here, s(x) denotes a polynomial randomly generated with a small coefficient.

Further, the processor 450 may calculate a first random polynomial (a(x)) from the ring. The first random polynomial may be expressed as follows.

$$a(x) \leftarrow R \qquad \text{[Expression 5]}$$

In addition, the processor 450 may calculate an error. For example, the processor 450 may extract an error from a discrete Gaussian distribution or a distribution within a short statistical distance thereto. Such an error may be expressed as follows.

$$e(x) \leftarrow D_{\alpha q}^n \qquad \text{[Expression 6]}$$

Once the error is calculated, the processor 450 may perform a modular computation of the error with the first random polynomial and the secret key to calculate a second random polynomial. The second random polynomial may be expressed as follows.

$$b(x) = -a(x)s(x) + e(x) (\text{mod } q) \qquad \text{[Expression 7]}$$

Finally, the public key (pk) may be set as follows in a form in which the first random polynomial and the second random polynomial are included. Meanwhile, in case that the computation device 400 supports residue number system (RNS) HEAAN, the processor 450 may generate a plurality of public keys corresponding to a plurality of integers that are disjoint from each other, respectively.

Here, the RNS HEAAN is a method in which $R_{qi}(q_i = \Delta^i)$ which is an existing ciphertext space is substituted with $R_{qi}$ ($q_i = \Pi p_i$, $\Delta^i$), $p_i \approx \Delta$ to resolve the problem that a method such as the Chinese remainder theorem is not applicable to the existing HEAAN. Accordingly, an approximate calculation result that a size of error bits is larger by about 5 to 10 is obtained, but the computation speed may be increased by 3 to 10 times. A specific ciphertext computation using the RNS HEAAN will be described later with reference to FIG. 9.

$$pk = (b(x), a(x)) \qquad \text{[Expression 8]}$$

The above-described key generation method is only an example, and the disclosure is not necessarily limited thereto, and it is a matter of course that the public key and the secret key may be generated by using other methods.

Meanwhile, once the public key is generated, the processor 450 may control the communication device 410 to transmit the public key to other devices.

Further, the processor 450 may generate a homomorphic ciphertext for the message. For example, the processor 450 may generate a homomorphic ciphertext by applying the public key generated as described above to the message. Here, the processor 450 may perform an encryption operation by using the prime number information as illustrated in FIG. 8 in the process of generating the homomorphic ciphertext.

A message to be encrypted may be received from an external source or may be input through an input device directly provided in or connected to the computation device 400. For example, in case that the computation device 400 includes a touch screen or a key pad, the processor 450 may store data input by the user through the touch screen or the key pad in the memory 420 and perform encryption on the data. Based on decryption being performed, the generated homomorphic ciphertext may be restored to a result value obtained by adding an error to a value obtained by reflecting the scaling factor in the message. As the scaling factor, a value that is input in advance and set may be used as it is.

Meanwhile, in case that the computation device 400 supports the RNS HEAAN, the processor 450 may generate a homomorphic ciphertext expressed as a plurality of bases, by using a plurality of public keys corresponding to a plurality of integers that are disjoint from each other, respectively, for the message.

Alternatively, the processor 450 may perform encryption by directly using the public key in a state of multiplying the message and the scaling factor. In this case, an error calculated in the encryption process may be added to a result value obtained by multiplying the message and the scaling factor.

Further, the processor 450 may generate the homomorphic ciphertext so that a length of the ciphertext corresponds to a value of the scaling factor.

Further, once the homomorphic ciphertext is generated, the processor 450 may store the homomorphic ciphertext in the memory 420 or control the communication device 410 to transmit the homomorphic ciphertext to another device according to a request from the user or a predetermined default command.

Meanwhile, according to an embodiment of the disclosure, packing may be performed. In case of using the packing in the homomorphic encryption, it is possible to encrypt multiple messages to a single ciphertext. In this case, when the computation device 400 performs a computation for each ciphertext, computations for multiples messages are performed in parallel. As a result, computation loads are greatly reduced.

For example, in case that a message is constituted by a plurality of message vectors, the processor 450 may convert the message into a polynomial capable of encrypting the plurality of message vectors in parallel, and multiply the polynomial by a scaling factor, thereby performing the homomorphic encryption by using the public key. As a result, the processor 450 may generate a ciphertext in which the plurality of message vectors is packed.

Further, in case that the homomorphic ciphertext needs to be decrypted, the processor 450 may generate a deciphertext in a polynomial form by applying the secret key to the homomorphic ciphertext and generate the message by decoding the deciphertext in a polynomial form. The generated message here may include the error as mentioned in the description of Expression 1.

Further, the processor 450 may perform a computation for the homomorphic ciphertext. For example, the processor 450 may perform a computation such as addition, subtraction, or multiplication while maintaining an encrypted state of the homomorphic ciphertext. Here, the multiplication may be the modular computation and may be performed in a manner as described later.

Meanwhile, in case that the homomorphic ciphertext is generated by the above-described RNS method, the processor 450 may perform addition and multiplication for each basis in the generated homomorphic ciphertext.

Meanwhile, once the computation is completed, the computation device 400 may detect data of an effective area from computation result data. For example, the computation device 400 may detect data of the effective area by performing rounding processing on the computation result data.

Here, the rounding processing means rounding off of the message in an encrypted state, which may also be referred to as rescaling. For example, the computation device 400 may eliminate a noise area by multiplying each component of the ciphertext by $\Delta^{-1}$ which is a reciprocal number of the scaling factor and rounding off a result thereof. The noise area may be determined to correspond to the value of the scaling factor. As a result, a message of the effective area without the noise area may be detected. Since the rounding processing is performed while maintaining the encrypted state, although an additional error occurs, a value of the error is small enough to be ignored.

Further, the modular multiplication as described above may be used for the above-described rounding processing.

In case that the computation device 400 supports the RNS HEAAN, when a weight of any one of the plurality of bases exceeds a threshold, the processor 450 may rescale the homomorphic ciphertext by performing the message rounding-off processing on each of the plurality of bases in the generated homomorphic ciphertext.

Further, in case that a weight of an approximate message in the computation result ciphertext exceeds a threshold, the computation device 400 may expand a plaintext space of the computation result ciphertext. For example, in case that q is smaller than M in Expression 1, since M+e (mod q) has a different value from that of M+e, decryption may not be performed. Therefore, a value of q needs to be always larger than M. However, as the computation proceeds, the value of q is gradually decreased. The expansion of the plaintext space means changing the ciphertext (ct) into a ciphertext with a larger modulus. The operation of expanding the plaintext space may also be referred to as rebooting. As the rebooting is performed, the computation for the ciphertext may become possible again.

Meanwhile, homomorphic encryption, decryption, addition, multiplication, rescaling, rebooting, or the like, based on the ring-LWE may be implemented by a computation of elements of a polynomial ring $$R_q = \frac{Z_q[X]}{(X^n + 1)}.$$

Among the above-described computations such as encryption, decryption, polynomial multiplication, and rebooting, the polynomial multiplication is the most time consuming computation. In particular, the polynomial multiplication is performed about five times while performing a Mult algorithm that is most frequently used, and therefore, it is important to speed up the corresponding computation.

In the disclosure, the polynomial multiplication is speeded up by using a speed-up method using the Chinese remainder theorem and a speed-up method using a plurality of predetermined prime number information. The method using the Chinese remainder theorem will be described later with reference to FIG. 9, and the method using the plurality of prime number information will be described below with reference to FIG. 3.

Figure 3:
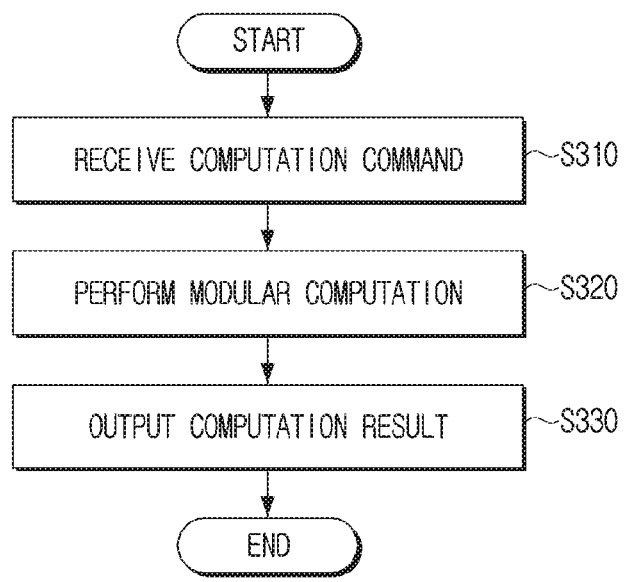
FIG. 3 is a flowchart for describing a ciphertext computation method according to an embodiment of the disclosure.

FIG. 3 is a flowchart for describing a ciphertext computation method according to an embodiment of the disclosure.

Referring to FIG. 3, a modular computation command for a plurality of ciphertexts may be received (S310). Such a command may be input from an external device or may be directly input in the computation device. Further, the computation command may be a command for message encryption or homomorphic ciphertext computation.

Then, the modular computation for the plurality of ciphertexts may be performed by using a lookup table storing a plurality of predetermined prime number information (S320). Here, each of the plurality of prime number information may be expressed by a combination of exponentiations of 2. An example of the prime number information is illustrated in FIG. 8.

Meanwhile, the modular computation for the homomorphic ciphertext may be performed by using various methods. Hereinafter, a first modular computation method will be described with reference to FIGS. 4 and 5, and a second modular computation method will be described with reference to FIGS. 6 and 7.

Then, a computation result may be output (S330). For example, the computation result may be output to a device that has requested the computation. Meanwhile, in case that the above-described computation command is a partial command required to perform an entire command such as message encryption, the computation result may be transferred to another operator (or computation program).

As described above, in the ciphertext computation method according to the disclosure, the modular computation is performed by using the predetermined prime number information, and thus only a small lookup table may be used. Further, since the predetermined prime number information is expressed by a combination of exponentiations of 2, integer multiplication may be performed only with a shift computation, and addition and subtraction, thereby further speeding up the computation.

Hereinafter, the first modular computation method for the homomorphic ciphertext will be described.

The first modular computation method (ModMult) may be expressed as the following Expression 9 in which a value obtained by multiplying [A/q] and q is subtracted from A.

$$A(\bmod q) = A - \left\lfloor \frac{A}{q} \right\rfloor \times q \qquad \text{[Expression 9]}$$

Here, A denotes a ciphertext (or polynomial) and q is an element for a modulus.

Figure 5:
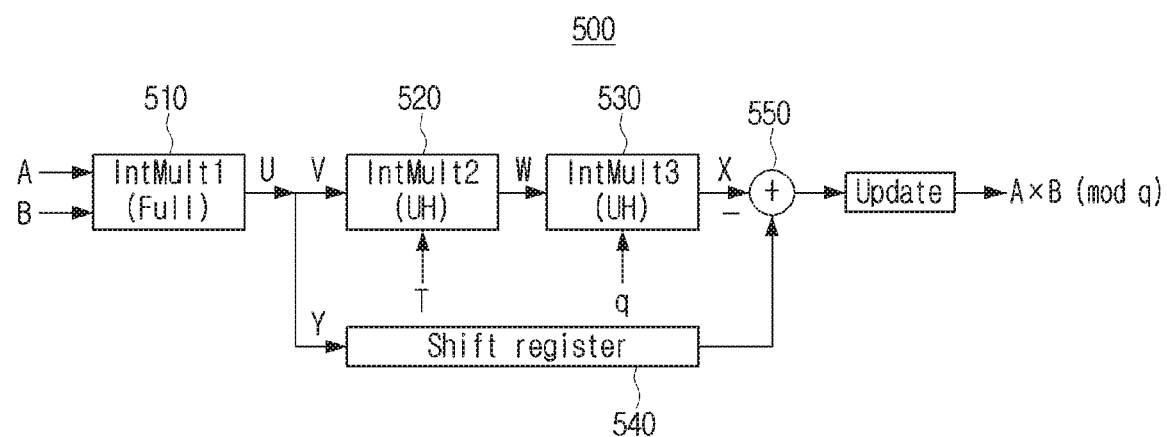
FIG. 5 is a diagram illustrating an architecture operated according to an algorithm of FIG. 4.

An algorithm implementing such an operation is as illustrated in FIG. 4, and an architecture implementing the algorithm of FIG. 4 is as illustrated in FIG. 5.

Referring to FIGS. 4 and 5, a first modular computation device 500 may include a first multiplier 510, a second multiplier 520, a third multiplier 530, a shift register 540, and a subtractor 550. The first modular computation device 500 may be the computation device of FIG. 2 or may be one computation module in a field programmable gate array (FPGA). Hereinafter, for convenience of explanation, a modulus multiplication operation for two ciphertexts will be described, but in an actual implementation, a modulus multiplication operation for polynomials, rather than the ciphertexts, may be used.

The first multiplier 510 may perform first multiplication of a first ciphertext A (or a first polynomial) and a second ciphertext B (or a second polynomial). Here, the first multiplier 510 may be a full multiplier (Full-IntMult) which outputs a multiplication result V of 2n bits by using the first ciphertext A of n bits and the second ciphertext B of n bits.

The second multiplier 520 may perform second multiplication of reciprocal number information T corresponding to one prime number information q of the plurality of prime number information, and a first multiplication result U. Specifically, the second multiplier 520 (IntMult2) may perform an operation of multiplying a significant bit of the output value of the first multiplier 510 by T scaled to 1/q.

For example, since a coefficient q of the third multiplier 530 as described later is applied only to a significant bit of the output value of the second multiplier 520, the second multiplier 520 may be an Upper Half (UH)-IntMult which outputs a multiplication result W of n bits by receiving two ciphertexts of n bits. Further, the reciprocal number information is a number that results in 1 when being multiplied by the prime number information, that is, a reciprocal (1/q) of the prime number, and the corresponding value may be stored in the lookup table in advance.

The third multiplier 530 may perform third multiplication by using a second multiplication result W and one prime number information q. For example, since only a less significant bit of the output value of the third multiplier 530 is multiplied by an output bit of the shift register 540, the third multiplier 530 may be a Lower Half (LH)-IntMult which outputs a multiplication result W of n bits by receiving two ciphertexts of n bits.

Further, the shift register 540 may delay the output value of the first multiplier 510 to provide the output value to the subtractor 550. For example, the shift register 540 may delay a less significant bit of the output value of the first multiplier 510 and may be implemented by flip flops (FF).

Therefore, the subtractor 550 may subtract the output value of the third multiplier 530 from the output value of the shift register 540 and may output a result thereof.

As described above, the second multiplier 520 and the third multiplier 530 each perform multiplication using the reciprocal number information T and the prime number information q.

Meanwhile, in the RNS-HEAAN, three types such as a basic modulus, a rescaling modulus, and a ModUp modulus are used and the modulus needs to be appropriate for 1 mod 2N in case that the degree of the polynomial is N−1. Further, a prime number q of which a reciprocal number T has a low hamming weight may be expressed by a value obtained by addition and subtraction of three or four exponentiations of 2 with different exponents as illustrated in FIG. 8.

As such, since the prime number used in the disclosure is expressed by a combination of exponentiations of 2, prime number multiplication may be performed only with a shift computation, and addition and subtraction operations in a computation process for the prime number and a reciprocal number of the prime number.

That is, the second multiplier 520 and the third multiplier 530 may each perform an individual shift computation based on an exponent of each of a plurality of exponentiations of 2, and may perform the second multiplication and the third multiplication, respectively, by performing addition or subtraction of shift computation results.

As such, a complicated prime number multiplication operation may be performed only with a shift computation and addition/subtraction, and thus it is possible to implement a high-speed computation.

Meanwhile, although the case that the modular multiplication is performed by receiving and processing ciphertexts is illustrated in FIGS. 5 and 6, various values may be used as an input for the modular multiplication in an actual implementation. That is, the modular multiplication may not only be used for the ciphertext computation, but also be used to calculate values required for the encryption process or used in the scaling or decryption process, and any value used in the above processes, other than the ciphertext, may be used.

Hereinafter, the second module computation method for the homomorphic ciphertext will be described.

Figure 7:
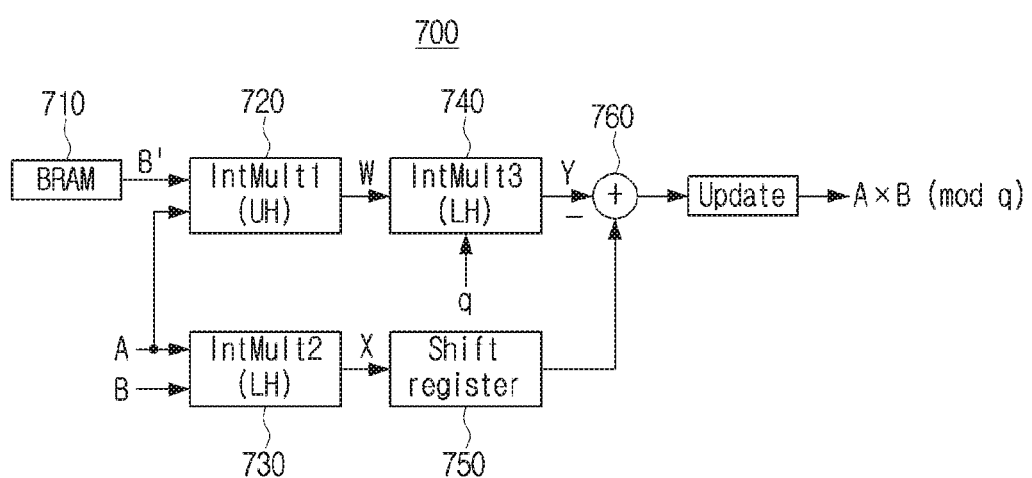
FIG. 7 is a diagram illustrating an architecture operated according to an algorithm of FIG. 6.

An algorithm of the second modular computation method (ModMult) is illustrated in FIG. 6, and an architecture implementing the algorithm of FIG. 6 is as illustrated in FIG. 7. The second modular computation method is similar to the first modular computation method but it is different from the first modular computation method in that a pre-calculated value is used.

Referring to FIGS. 6 and 7, a second modular computation device 700 may include a memory 710, a fourth multiplier 720, a fifth multiplier 730, a sixth multiplier 740, a shift register 750, and a subtractor 760.

The memory 710 may store a "pre-calculated value B' obtained by multiplying a reciprocal number corresponding to one prime number information and the second ciphertext". The memory 710 may be a static random access memory (SRAM), and may be a buffer in the ASIC. The pre-calculated value B' is an approximate value of B/q, and as B' is used, A×B/q may be approximated to W.

The fourth multiplier 720 may perform first multiplication of the pre-calculated value B' stored in the memory 710 and the first ciphertext A.

The fifth multiplier 730 may perform second multiplication of the first ciphertext A and the second ciphertext B.

The sixth multiplier 740 may perform third multiplication by using a first multiplication result W and prime number information q. For example, in case of using the prime number information illustrated in FIG. 8, the sixth multiplier 740 may perform an individual shift computation based on an exponent of each of a plurality of exponentiations of 2, and may perform the above-described multiplication by performing addition or subtraction of shift computation results.

Further, the shift register 750 may delay an output value X of the fifth multiplier 510 and provide the output value X to the subtractor 760.

The subtractor 760 may perform subtraction of a second multiplication result X transferred from the shift register 750 and a third multiplication result Y.

As such, the second modular computation device 700 uses only two LH-IntMult and a single UH-IntMult, and thus a calculation complexity is lower than that of the first modular computation device.

Further, in case that one of an input number and a coefficient is a constant, a pre-calculated value may be used for a part of the calculation. Further, since the IntMult may be replaced with the LH-IntMult, the number of digital signal processor (DSP) slices may be decreased, which is advantageous.

In addition, since the fourth multiplier 720 and the fifth multiplier 730 are operated in parallel, a delay is shorter as compared with the first modular computation device, and a depth of the shift register 750 may also be smaller as compared with the shift register 540 of the first modular computation device 500.

FIG. 8 is a diagram illustrating an example of a set of prime numbers according to an embodiment of the disclosure.

Referring to FIG. 8, the lookup table of the disclosure may have 12 prime numbers 810 of 62 bits and scaled values (that is, reciprocal numbers) 820 for the respective 12 prime numbers.

Each prime number may be $2^{61}-2^{26}+1$, $2^{61}-2^{24}-2^{20}+1$, $2^{61}-2^{24}+1$, $2^{61}-2^{22}+2^{19}+1$, $2^{61}-2^{21}+1$, $2^{61}-2^{21}+2^{16}+1$, $2^{61}+2^{22}+2^{20}+1$, $2^{61}+2^{23}-2^{18}+1$, $2^{61}+2^{23}+2^{21}+1$, $2^{61}+2^{24}-2^{19}+1$, $2^{61}+2^{25}+2^{23}+1$, or $2^{61}+2^{26}+2^{16}+1$, and is expressed by a combination of exponentiations of 2. As such, the prime number that may be expressed by a combination of exponentiations of 2 is used in the disclosure, and thus multiplication of the prime number may be performed only with a shift computation, and addition and subtraction.

Further, each reciprocal number may be $2^{61}+2^{26}-1$, $2^{61}+2^{24}+2^{20}-1$, $2^{61}+2^{24}-1$, $2^{61}+2^{22}-2^{19}-1$, $2^{61}+2^{21}-1$, $2^{61}+2^{21}-2^{16}-1$, $2^{61}-2^{22}-2^{20}-1$, $2^{61}-2^{23}+2^{18}-1$, $2^{61}-2^{23}-2^{21}-1$, $2^{61}-2^{24}+2^{19}-1$, $2^{61}-2^{25}-2^{23}-1$, or $2^{61}-2^{26}-2^{16}-1$, and is expressed by a combination of exponentiations of 2.

Meanwhile, the prime number information illustrated in FIG. 8 indicates prime numbers used at the time of the modular multiplication, and prime number information with a different number of bits may be used in case of the basic modulus or the rescaling process. For example, in the rescaling process, 11 prime numbers of 45 bits may be used.

Hereinafter, the speed-up method using the Chinese remainder theorem (CRT) will be described.

$Z_q$ is a ring expressed by integers and is a set of remainders upon division by an integer q. The above-described ring may be expressed in various manners. For example, the ring may be expressed by Expression 10.

$$\mathbb{Z}_q = \left\{ -\frac{q}{2}, -\frac{q}{2}+1, \ldots, \frac{q}{2}-1 \right\}$$ [Expression 10]

Further, $Z_q$ is a polynomial ring formed from polynomials of which a coefficient is an element of Zq and a degree is less than n.

$$R_q = \{f(X) = f_0 + f_1 X + \ldots + f_{n-1} X^{n-1} | f_0, f_1, \ldots, f_{n-1} \in \mathbb{Z}_q\}$$ [Expression 11]

Meanwhile, when multiplication of two polynomials $f(X)=f_0+f_1X+\ldots+f_{n-1}X^{n-1}$ and $g(x)=g_0+g_1X+\ldots+g_{n-1}X^{n-1}$ is performed, a total n×n terms are generated, and thus a total $n^2$ times of $Z_q$ multiplication is required.

In the disclosure, the polynomial multiplication may be parallelized and speeded up by using the Chinese remainder theorem (CRT) algorithm.

The CRT algorithm is an algorithm expressed by the following Expression 12.

$$CRT: \prod_{i=1}^{k} \mathbb{Z}_{Qi} \to \mathbb{Z}_Q : (a_1, a_2, \ldots a_k) \to a$$ [Expression 12]

Here, $Q=\Pi^k_{i=1}Q_i$ and each $Q_i$ is an integer that is disjoint. Further, a is an integer satisfying $a \equiv a_i \mod p_i$ with respect to all i.

Further, iCRT refers to an inverse function of the CRT and may be performed as modulus calculation for integers.

Figure 9:
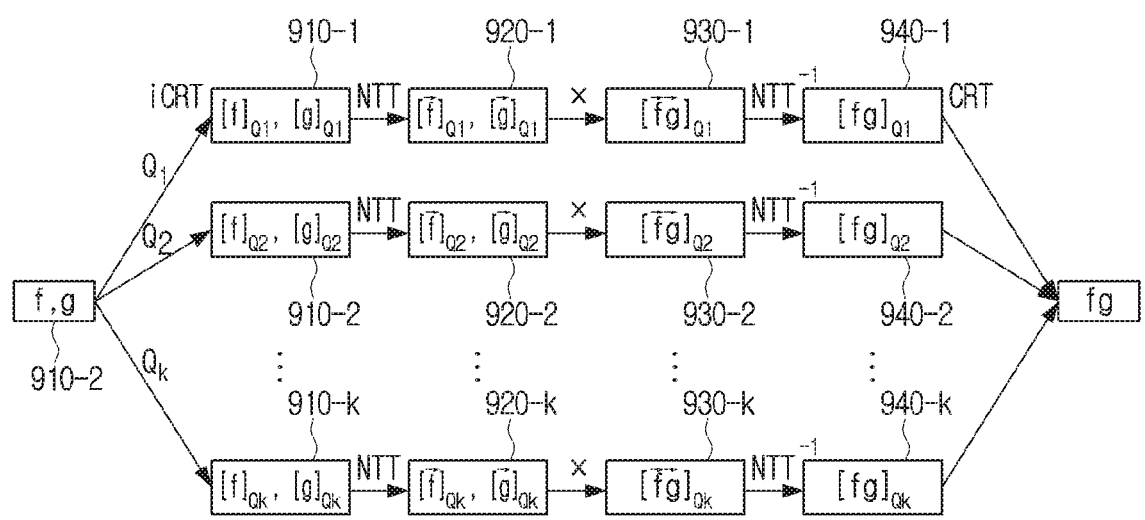
FIG. 9 is a diagram for describing a method for performing modular computations in parallel.

FIG. 9 is a diagram for describing a method for performing modular computations in parallel.

Referring to FIG. 9, n coefficients may be given as input values for each of two given functions (f and g).

Further, the iCRT may be performed for the predetermined $Q=\Pi^k_{i=1}Q_i$ and the 2n input values. Here, since the iCRT is modulus calculation for each coefficient, parallelization may be performed for each of 2nk and result values may be classified into k types based on the applied $Q_i$.

Further, the result values classified into k types may be further classified into two types based on f and g, and a number theoretic transform (NTT) may be performed for each type. Here, respective components 910-1, 910-2, ..., and 910-k of a result value vector may be calculated in parallel.

Here, the NTT algorithm (or a Fast Fourier Transform (FTT) algorithm as described later), which is an algorithm of performing a function such as the following Expression 13, may be considered as polynomial calculation.

NTT: $\mathbb{Z}_q[X]/(X^n+1) \to \mathbb{Z}_q^n : f(X) \to (f(1), f(\zeta), f(\zeta^2), \ldots, f(\zeta^{n-1}))$ [Expression 13]

Here, $\zeta$ is one of primitive values of $X^{n+1}$, and $\zeta^n = -1$.

The NTT algorithm requires $O(n^2)$ times of $Z_q$ multiplication, and the FFT algorithm with a Butterfly operation as a sub-routine algorithm requires $O(n \log n)$ times of $Z_q$ multiplication.

An algorithm performing the above-described inverse function also requires the same times of multiplication. In this respect, polynomial multiplication using the NTT may be configured by 1) performing the NTT computation on two given polynomials, 2) performing $Z_q$ multiplication for each component of an n-th vector obtained by the NTT operation, and 3) performing an inverse NTT computation on a result value of the $Z_q$ multiplications.

Further, two NTT result values 920-1, 920-2, ..., and 920-k obtained for each of k types may be multiplied for each component. As in the above-described process, parallelization of k types may be performed.

The inverse NTT computation may be performed on one of the multiplication result values 930-1, 930-2, ..., and 913-k obtained for each of k types through the above-described process. Here, parallelization of k types may be performed.

Further, the CRT may be performed by gathering all result values 940-1, 940-2, ..., and 940-k obtained for each of k types.

Meanwhile, in an actual implementation, a known high-speed computation method may be used when performing division of an element of $Z_q$ by $Q_i$ and multiplication of each $Z_{qi}$, thereby additionally increasing a speed of the computation.

As described above, in the disclosure, since the polynomial multiplication is performed based on a polynomial coefficient that is significantly smaller as compared with that according to the related art, it is possible to perform the polynomial multiplication at a much higher speed. In addition, multiplication for the homomorphic encryption is greatly speeded up.

Further, the above-described algorithm is an algorithm particularly specialized for parallel calculation, and thus is very effective in implementing parallelization in manufacturing of the ASIC in which the computation for the homomorphic encryption is performed, in addition to the multi-core processor, the GPU, and the FPGA. The parallelization performed in each algorithm is as follows, and thus a speed up of n times as compared with that according to the related art becomes possible.

In particular, referring to FIG. 10, it may be appreciated that, in case of using the CRT and the iCRT as described above, a total delay time may be decreased to O(log n)+O (log q log log q) with n processors, and an appropriate speed-up may be implemented even when the number of processors is not n.

Meanwhile, the ciphertext processing method according to various embodiments described above may be implemented in a form of a program code for performing each process, stored in a recording medium, and distributed. In this case, a device on which the recording medium is mounted may perform operations such as the encryption or ciphertext processing.

The recording medium may be various types of computer-readable recording media such as a ROM, a RAM, a memory chip, a memory card, an external hard disk, a hard disk drive, a compact disc (CD), a digital versatile disc (DVD), a magnetic disk, and a magnetic tape.

Although the description of the disclosure has been made with reference to the accompanying drawings, the scope of the rights of the disclosure is defined by the appended claims and is not construed as being limited to the described embodiments and/or the drawings. In addition, it should be understood that various improvements, modifications and changes of the embodiments described in the claims which are obvious to those skilled in the art are included in the scope of rights of the disclosure.

What is claimed is:

1. A ciphertext computation method comprising:
receiving, by a processor, a modular computation command for a plurality of ciphertexts;
performing a modular computation for the plurality of ciphertexts by accessing a lookup table in computer memory storing a plurality of predetermined prime number information; and
outputting, by the processor, a result of the computation;
wherein the plurality of prime number information is each expressed by a combination of exponentiations of 2, and
in the performing of the modular computation, an individual shift computation is performed by the processor based on an exponent of each of a plurality of exponentiations of 2 constituting a prime number, and addition or subtraction of shift computation results are performed by the processor,
wherein the prime number is a value obtained by addition and subtraction of three or four exponentiations of 2 with different exponents.

2. The ciphertext computation method as claimed in claim 1, wherein the lookup table includes at least one of $2^{61}-2^{26}+1$, $2^{61}-2^{24}-2^{20}+1$, $2^{61}-2^{24}+1$, $2^{61}-2^{22}+2^{19}+1$, $2^{61}-2^{21}+1$, $2^{61}-2^{21}+2^{16}+1$, $2^{61}+2^{22}+2^{20}+1$, $2^{61}+2^{23}-2^{18}+1$, $2^{61}+2^{23}+2^{21}+1$, $2^{61}+2^{24}-2^{19}+1$, $2^{61}+2^{25}+2^{23}+1$, or $2^{61}+2^{26}+2^{16}+1$.

3. The ciphertext computation method as claimed in claim 1, wherein the performing of the modular computation includes:
performing first multiplication of a first ciphertext and a second ciphertext;
performing second multiplication of reciprocal number information corresponding to one of the plurality of prime number information and a result of the first multiplication;
performing third multiplication by using a result of the second multiplication and the one prime number information; and
performing subtraction of the result of the first multiplication and a result of the third multiplication.

4. The ciphertext computation method as claimed in claim 3, wherein the one prime number information includes information on exponentiations of 2, and in the performing of the third multiplication, an individual shift computation is performed based on an exponent of each of the exponentiations of 2, and the third multiplication is performed by performing addition or subtraction of shift computation results.

5. The ciphertext computation method as claimed in claim 3, wherein the reciprocal number information includes information on exponentiations of 2, and in the performing of the second multiplication, an individual shift computation is performed based on an exponent of each of the exponentiations of 2, and the second multiplication is performed by performing addition or subtraction of shift computation results.

6. The ciphertext computation method as claimed in claim 3, wherein in the performing of the second multiplication and the performing of the third multiplication, a computation result is output while having the same number of bits as that of the first ciphertext or the second ciphertext.

7. The ciphertext computation method as claimed in claim 1, wherein the performing of the modular computation includes:
performing first multiplication of a pre-calculated value obtained by multiplying a reciprocal number corresponding to one prime number information and a second ciphertext and a first ciphertext;
performing second multiplication of the first ciphertext and the second ciphertext;
performing third multiplication by using a result of the first multiplication and the prime number information; and
performing subtraction of a result of the second multiplication and a result of the third multiplication.

8. The ciphertext computation method as claimed in claim 1, wherein a prime number corresponding to the prime number information is a value obtained by multiplying a plurality of different scaling factors, and the plurality of different scaling factors are values that are disjoint from each other.

9. The ciphertext computation method as claimed in claim 8, wherein in the performing of the modular computation, the modular computation is performed for each basis of each of the plurality of ciphertexts.

10. A computation device comprising:
a memory configured to store at least one instruction and a plurality of predetermined prime number information; and
a processor configured to execute the at least one instruction,
wherein the processor executes the at least one instruction to perform a modular computation for a plurality of ciphertexts by using one of the plurality of predetermined prime number information;
wherein the plurality of prime number information are each expressed by a combination of exponentiations of 2, and
the processor performs an individual shift computation based on an exponent of each of a plurality of exponentiations of 2 constituting a prime number, and perform addition or subtraction of shift computation results, wherein the prime number is a value obtained by addition and subtraction of three or four exponentiations of 2 with different exponents.

11. The computation device as claimed in claim 10, wherein a prime number corresponding to the prime number information is a value obtained by multiplying a plurality of different scaling factors, the plurality of different scaling factors are values that are disjoint from each other, and the processor performs the modular computation for each basis of each of the plurality of ciphertexts.

12. The computation device as claimed in claim 10, wherein the processor is a field programmable gate array (FPGA).

* * * * *